United States Patent
Kuo et al.

(10) Patent No.: US 10,642,086 B2
(45) Date of Patent: May 5, 2020

(54) OPTICAL FILM

(71) Applicant: BenQ Materials Corporation, Taoyuan (TW)

(72) Inventors: Chen-Kuan Kuo, Taoyuan (TW);
Cyun-Tai Hong, Taoyuan (TW);
Chuen-Nan Shen, Taoyuan (TW);
Meng-Jie Lin, Taoyuan (TW);
Chia-Feng Lin, Taoyuan (TW);
Meng-Chia Cheng, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 127 days.

(21) Appl. No.: 16/036,675

(22) Filed: Jul. 16, 2018

(65) Prior Publication Data

US 2019/0025631 A1    Jan. 24, 2019

Related U.S. Application Data

(60) Provisional application No. 62/535,145, filed on Jul. 20, 2017, provisional application No. 62/535,154, filed on Jul. 20, 2017.

(30) Foreign Application Priority Data

Dec. 14, 2017 (TW) .............................. 106144023 A

(51) Int. Cl.
*G02F 1/1335* (2006.01)
*G11B 7/135* (2012.01)
*G02B 5/18* (2006.01)

(52) U.S. Cl.
CPC ..... *G02F 1/133504* (2013.01); *G02B 5/1842* (2013.01); *G02B 5/1866* (2013.01); *G11B 7/135* (2013.01)

(58) Field of Classification Search
CPC ............ G02F 1/133504; G02B 5/1842; G02B 5/1866; G02B 5/223; G02B 27/4272; G02B 5/1823; G02B 5/1838; G11B 7/135
See application file for complete search history.

(56) References Cited

U.S. PATENT DOCUMENTS

2005/0275944 A1 * 12/2005 Wang .................... B82Y 20/00
359/576

FOREIGN PATENT DOCUMENTS

| JP | P2010-39259 A | 2/2010 |
|----|---------------|--------|
| JP | 2013-195579 A | 9/2013 |
| TW | 200501135 A | 1/2005 |
| TW | 200734702 A | 9/2007 |

* cited by examiner

*Primary Examiner* — Kimberly N. Kakalec

(57) ABSTRACT

The invention provides an optical film for improving image quality of a liquid crystal display comprising: a light directing structure layer, a first filling layer, a plurality of first diffraction gratings and a second filling layer. The light directing structure layer comprises a plurality of light directing micro structures, wherein the ratio of height to width of each light directing micro structure is in the range of 1.5 to 6. The first filling layer is disposed on the light directing structure layer, and the refractive index of the first filling layer and the light directing structure layer are different. The first diffraction gratings along with a first direction are formed on the first filling layer. The second filling layer is disposed on the first diffraction gratings and the refractive index of the second filling layer and the first diffraction gratings are different.

18 Claims, 13 Drawing Sheets

OPTICAL FILM

This application claims the benefit of Taiwanese application Ser. No. 106144023, filed on, Dec. 14, 2017, U.S. provisional application Ser. No. 62/535,145, filed on Jul. 20, 2017, and U.S. provisional application Ser. No. 62/535,154, filed on Jul. 20, 2017, the subject matters of which are incorporated herein by reference.

BACKGROUND OF THE INVENTION

Field of the Invention

The invention relates to an optical film for liquid crystal display for eliminating the problem of color washout at large viewing angles and light leakage in dark state, enhancing the color performance at wide viewing angles and making the liquid crystal display have uniform dark-state images.

Description of the Related Art

The common liquid crystal display is a non-self-luminous display, thus the image quality at wide viewing angle is significantly below the image quality at center viewing angle after the light from the back light unit passes through the liquid crystal panel due to the asymmetry of liquid crystal molecules. Especially when displaying black images, due to the back light unit of the general liquid crystal display cannot be turned off, the liquid crystal panel is switched to the dark state to shade the light. Therefore, the liquid crystal display has the problem of varying degrees of light leakage at different viewing angles, thus, the contrast ratio and color of the liquid crystal display may differ depending on the viewing angles and resulting in color washout or non-uniformity. Referred to FIG. 1 which is a brightness distribution of a common liquid crystal display at different horizontal viewing angle in dark state. As shown in FIG. 1, the maximum light leakage in dark state appears at horizontal viewing angle 45°, in contrast, the darkest in dark state appears at horizontal viewing angle 0°, the center viewing angle has minimize light leakage. Therefore, when the user views the liquid crystal display at different viewing angles, the visual experience might be affected due to the perceived drop in image quality.

Therefore, the present invention intends to provide an optical film to reduce the light leakage defect of liquid crystal display in at wide viewing angle, make the liquid crystal display present a uniform dark state image and eliminate the problem of color washout.

SUMMARY OF THE INVENTION

According to an aspect of the present invention, an optical film is provided. The present optical film comprises a light directing structure layer comprising a plurality of light directing micro structures, wherein the ratios of height to width of the light directing micro structures are in the range of 1.5 to 6; a first filling layer disposed on the light directing micro structures and covering the light directing micro structures, and the refractive index of the first filling layer and the light directing structure layer are different; a plurality of first diffraction gratings along with first direction formed on the first filling layer; and a second filling layer disposed on the first diffraction gratings, wherein the refractive index of the second filling layer and the first diffraction gratings are different.

In an embodiment of the present invention, wherein the heights of the light directing micro structures are independently in the range of 15 µm to 30 µm.

In an embodiment of the present invention, wherein the widths of the light directing micro structures are independently in the range of 5 µm to 9 µm.

In an embodiment of the present invention, wherein the gaps between adjacent two of the light directing micro structures are independently in the range of 24 µm to 45 µm.

In an embodiment of the present invention, wherein the light directing micro structures are continuous or a discontinuous columnar micro structures.

In an embodiment of the present invention, wherein the cross-sectional shapes of the light directing micro structures can be independently polygon, circle, oval, quadrilateral or diamond shape.

In an embodiment of the present invention, wherein the difference of the refractive index of the second filling layer and the first diffraction gratings is no less than 0.1 and no more than 0.3.

In another embodiment of the present invention, wherein a plurality of second diffraction gratings along with second direction can be formed on the second filling layer, and the first direction and the second direction are substantially parallel.

In another embodiment of the present invention, the optical film further comprises a third filling layer disposed on the second diffraction gratings and covering the second diffraction gratings for filling the second diffraction gratings, wherein the refractive index of the third filling layer and the second diffraction gratings are different.

In an embodiment of the present invention, wherein the difference of the refractive index of the third filling layer and the second diffraction gratings is no less than 0.1 and no more than 0.3.

In an embodiment of the present invention, wherein the widths of the first diffraction gratings and the second diffraction gratings are independently in the range of 0.3 µm to 1.5 µm.

In an embodiment of the present invention, wherein the gaps between adjacent two of the first diffraction gratings and the gaps between adjacent two of the second diffraction gratings are independently in the range of 0.3 µm to 1.5 µm.

In an embodiment of the present invention, wherein the heights of the first diffraction gratings and the second diffraction gratings are independently in the range of 0.5 µm to 1.5 µm.

In another embodiment of the present invention, wherein the light directing structure layer further comprises a dye including dye molecules or light-absorbing particles for absorbing light with a specific wavelength.

In still another embodiment of the present invention, wherein the first filling layer further comprises a dye including dye molecules or light-absorbing particles for absorbing light with a specific wavelength.

In further another embodiment of the present invention, wherein the second filling layer further comprises a dye including dye molecules or light-absorbing particle for absorbing light with a specific wavelength.

In still further another embodiment of the present invention, wherein the third filling layer further comprises a dye including dye molecules or light-absorbing particles for absorbing light with a specific wavelength.

In another aspect of the optical film of the present invention, the optical film can further comprise an adhesive layer disposed between the first filling layer and the first diffraction gratings selectively.

In further another aspect of the optical film of the present invention, the optical film can further comprise a functional film adhered to the third filling layer selectively, wherein the functional film can be a polarizing film, a hard-coating film, a low reflective film, an anti-reflective film, an anti-glaring film, a protective film or combinations thereof.

The above and other aspects of the invention will become better understood with regard to the following detailed description of the preferred but non-limiting embodiment(s). The following description is made with reference to the accompanying drawings.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings, the structure of the apparatus known only schematically depicted in figure.

Figure 1:
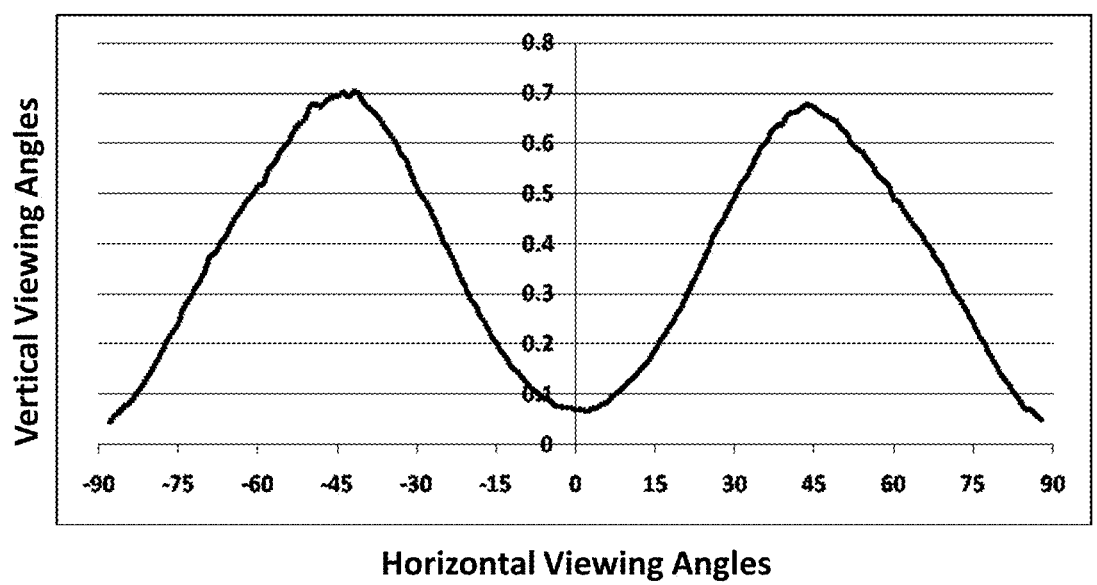
FIG. 1 is a brightness distribution of a known liquid crystal display at different viewing angles in dark state.
Figure 2:
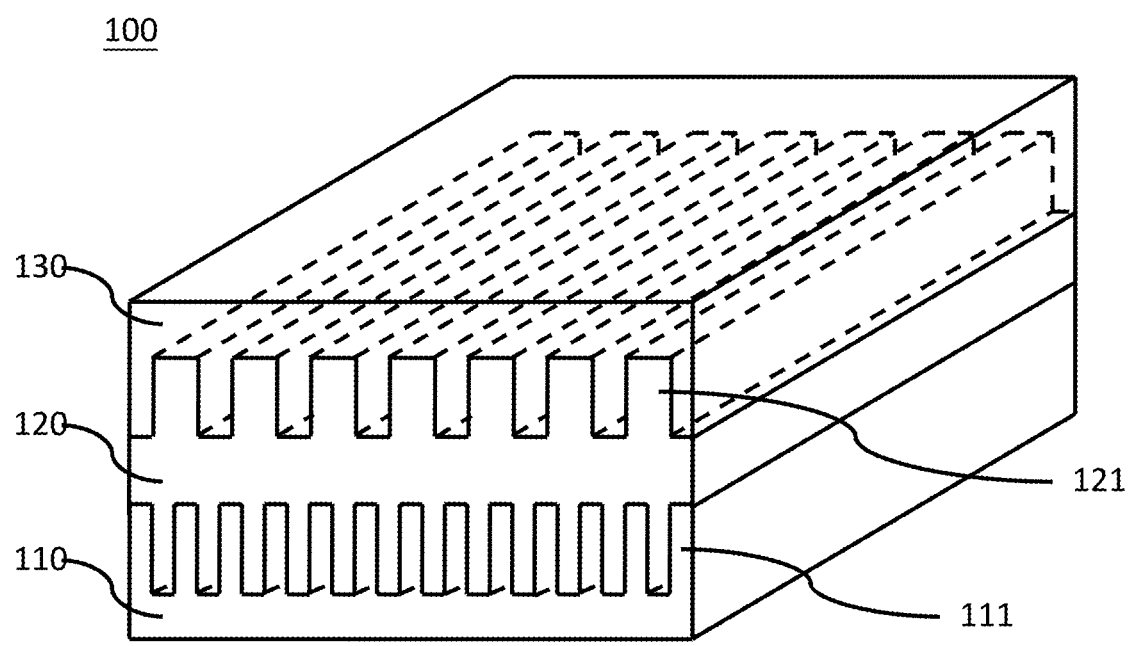
FIG. 2 is a stereoscopic perspective view of an optical film of an embodiment of the present invention.

An objection of the invention is to provide an optical film. FIG. 2 shows a stereoscopic perspective view of an optical film of an embodiment of the present invention. The present optical film 100 comprises a light directing structure layer 110, a first filling layer 110 disposed on the light directing structure layer 110, a plurality of first diffraction gratings 121 along with first direction formed on the first filling layer 120, and a second filling layer 130 disposed on the first diffraction gratings 121. In an embodiment of the present invention, the first diffraction gratings 121 are formed directly on the first filling layer 120. In another embodiment of the present invention, an adhesive layer (not shown) is disposed on a surface of the first filling layer 120 and the first diffraction gratings 121 are adhered by the adhesive layer.

Figure 3A:
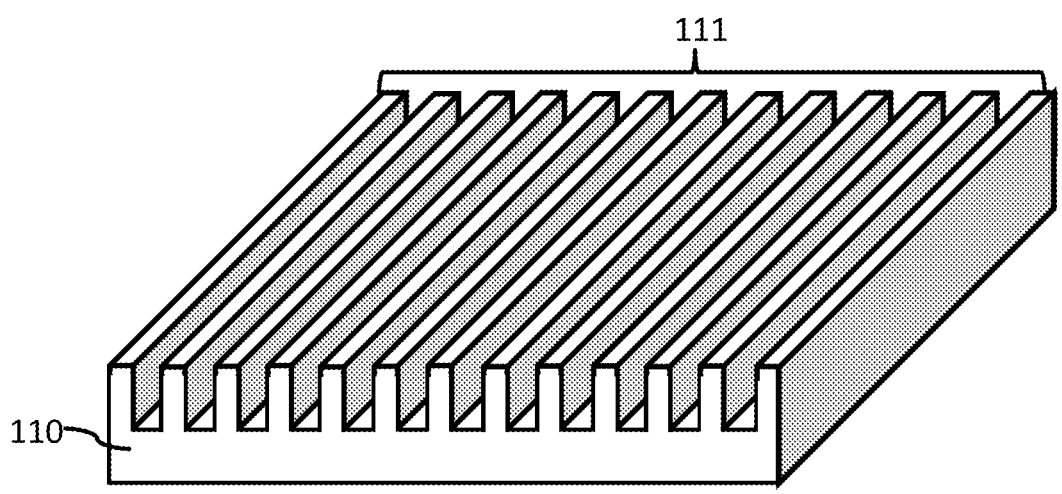
FIG. 3A is a stereoscopic perspective view of the light directing structure layer of an embodiment of the present invention.
Figure 3B:
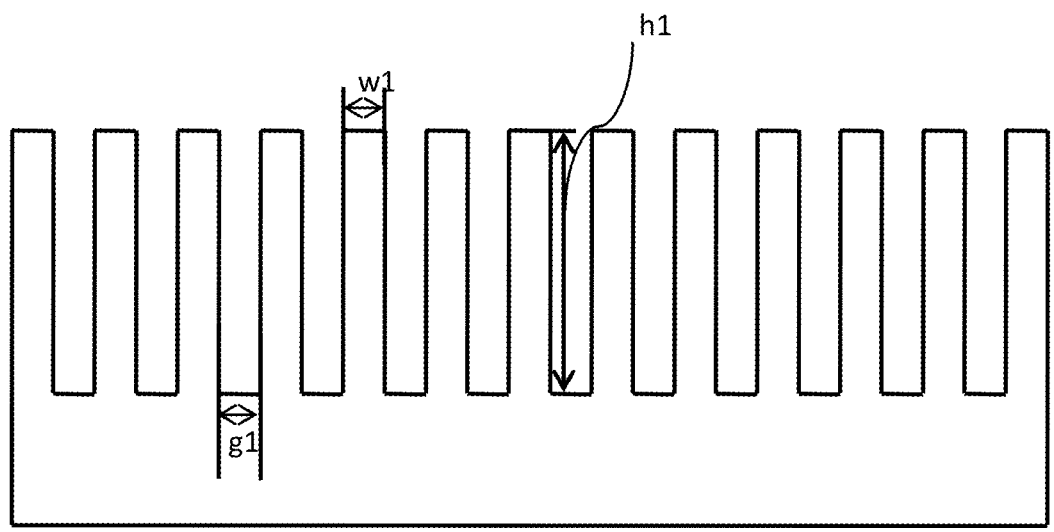
FIG. 3B is a cross-sectional view of the light directing structure layer of an embodiment of the present invention.

Referred to FIG. 3A and FIG. 3B. FIG. 3A shows a stereoscopic perspective view of the light directing structure layer 110 of an embodiment of the present invention. FIG. 3B shows a cross-sectional view of the light directing structure layer 110 of an embodiment of the present invention. The light directing structure layer 110 comprises a plurality of light directing micro structures 111. In an embodiment of the present invention, the heights h1 of the light directing micro structures 111 are independently in the range of 15 μm to 30 μm, the widths w1 of the light directing micro structures 111 are independently in the range of 5 μm to 9 μm, the gaps between adjacent two of the light directing micro structures 111 are independently in the range of 24 μm to 45 μm, the ratios of height to width of the light directing micro structures 111 (h1/w1) are in the range of 1.5 to 6, and preferably in the range of 2 to 5. In an embodiment of the present invention, the light directing micro structures 111 can be continuous or discontinuous columnar micro structures. The cross-sectional shapes of the light directing micro structures 111 can be independently one of polygon, circle, oval, quadrilateral and diamond shape. In an embodiment of the present invention, the light directing structure layer 110 is made from an UV curable resin or a thermal curable resin, such as, an acrylic resin, a silicone resin, a polyurethane resin, an epoxy resin or combinations thereof, but not limited thereto. The refractive index of the light directing structure layer 110 can be in the range of 1.4 and 1.7. The light directing structure layer 110 is used to collimate the light passed through the liquid crystal panel and generated from the back light unit of the liquid crystal display for improving the image quality of display effectively.

The first filling layer 120 is disposed on the light directing micro structure layer 110 as shown in FIG. 2. The first filling layer 120 is used to fill the light directing micro structures 111. The first filling layer 120 is made from an UV curable resin or a thermal curable resin, such as, an acrylic resin, a silicone resin, a polyurethane resin, an epoxy resin or combinations thereof, but not limited thereto. The refractive index of the first filling layer 120 can be in the range of 1.4 and 1.7, and the refractive index of the first filling layer 120 and the light directing structure layer 110 are different.

Figure 4A:
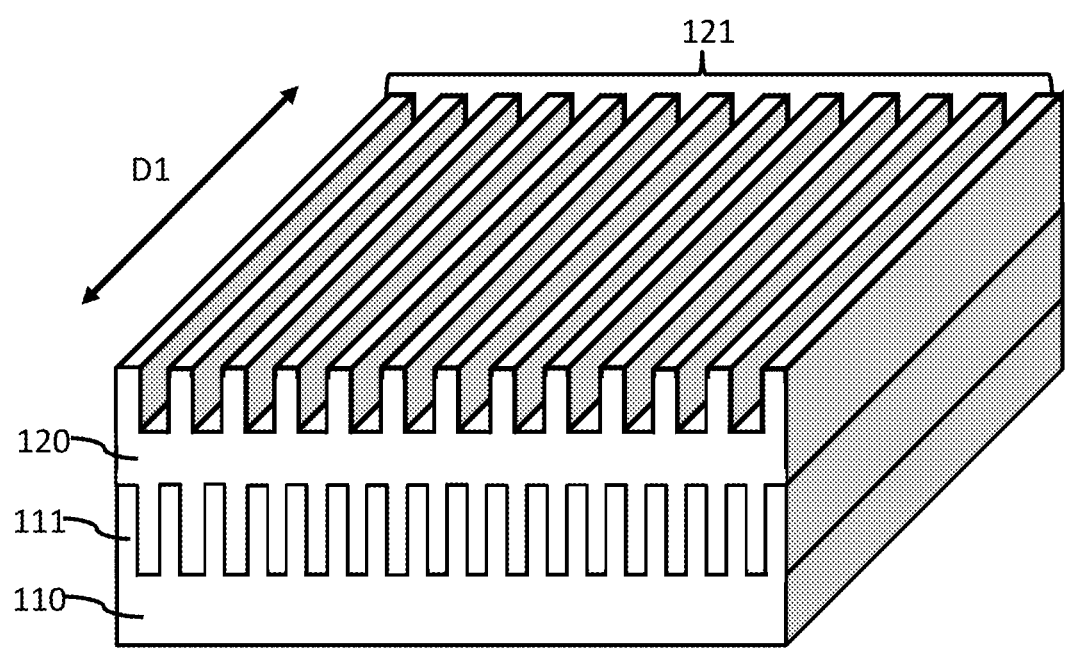
FIG. 4A is a stereoscopic perspective view of the first diffraction gratings formed on the first filling layer of an embodiment of the present invention.
Figure 4B:
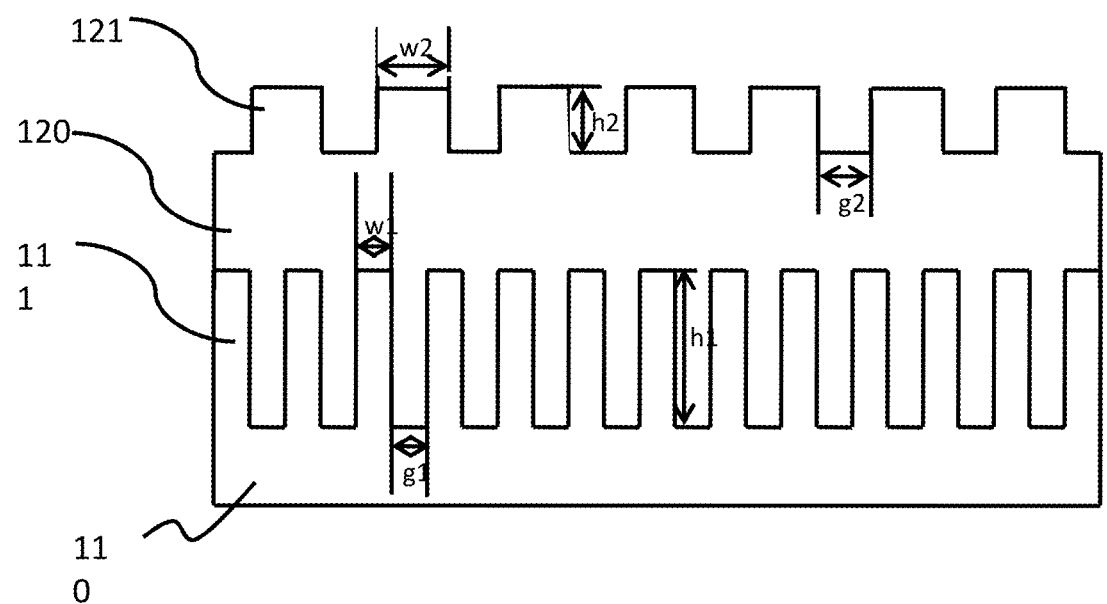
FIG. 4B is a cross-sectional view of the first diffraction gratings formed on the first filling layer of an embodiment of the present invention.

FIG. 4A shows a stereoscopic perspective view of the first diffraction gratings 121 formed on the first filling layer 120 of an embodiment of the present invention. A plurality of first diffraction gratings 121 along with first direction D1 are formed on the first filling layer 120 as shown in FIG. 4A. The dimensions of the first diffraction gratings 121 can be determined by the demand of different designs of displays and the corresponding light directing micro structures 111. FIG. 4B shows a cross-sectional view of the first filling layer 120 and the first diffraction gratings. As shown in FIG. 4B, each of the first diffraction gratings 121 has a height of h2 in the range of 0.5 μm to 1.5 μm, and preferably in the range of 0.7 μm to 1.3 μm, and a width of w2 in the range of 0.3 μm to 1.5 μm, and preferably in the range of 0.4 μm to 0.6 μm. Each gap between adjacent two of the first diffraction gratings 121 is in the range of 0.3 μm to 1.5 μm, and preferably in the range of 0.4 μm to 0.6 μm. The first diffraction gratings 121 can have the same or different dimensions, and can be sequentially and periodically or randomly formed on the surface of the first filling layer 120.

In an embodiment of the present invention, the first diffraction gratings 121 can be formed by, for example, embossing a curable resin, but not limited thereto. The curable resin can be an UV curable resin or a thermal curable resin and the refractive index of the curable resin can be in the range of 1.4 and 1.7. Suitable curable resin can be but not limit to an acrylic resin, a silicone resin, a polyurethane resin, an epoxy resin or combinations thereof.

Selectively, the first diffraction gratings 121 can be formed on the first filling layer 120 directly or adhered to the first filling layer 120 by an adhesive layer. Suitable materials of the adhesive layer can be but not limited to acrylic resin, silicone resin, polyurethane resin, epoxy resin or the combinations thereof.

The second filling layer 130 is disposed on the first diffraction gratings 121 to fill the first diffraction gratings. The second filling layer 130 can be formed from an UV curable resin or a thermal curable resin. Suitable curable resin can be but not limited to an acrylic resin, a silicone resin, a polyurethane resin, an epoxy resin or the combinations thereof. In an embodiment of the present invention, the refractive index of the second filling layer 120 can be in the range of 1.4 and 1.7, and the refractive index difference of the second filling layer 130 and the first diffraction gratings 121 is not less than 0.1 and not more than 0.3.

Figure 5:
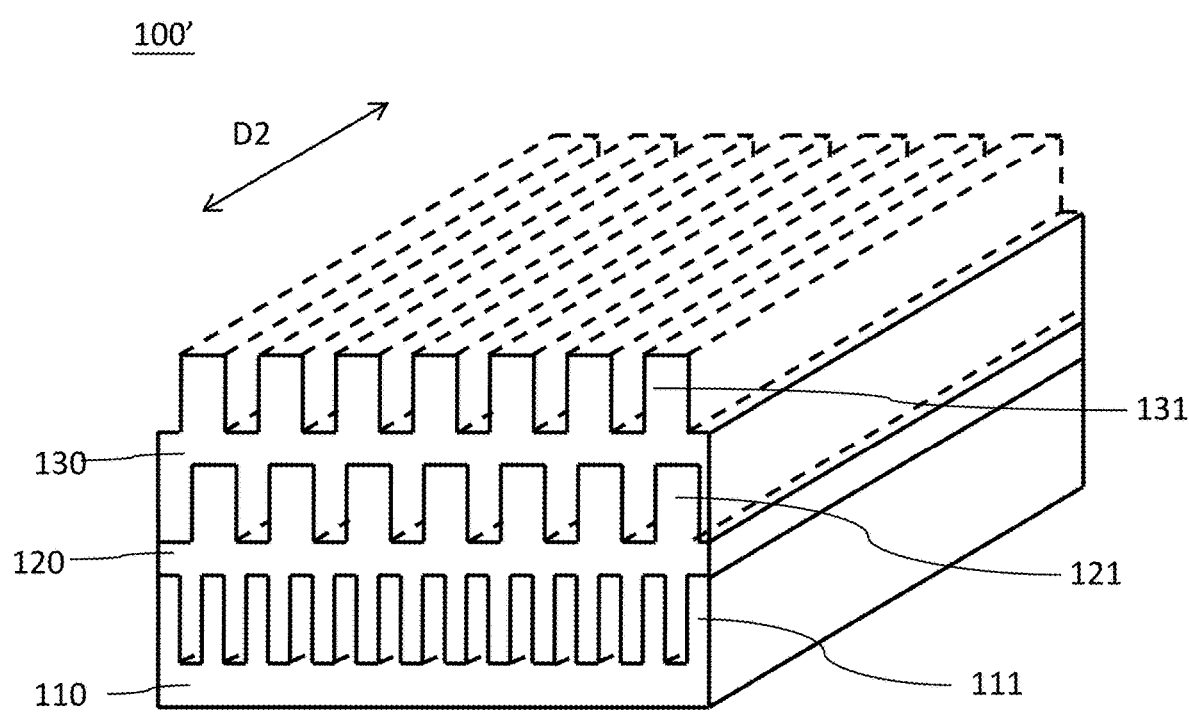
FIG. 5 is a stereoscopic perspective view of another optical film of the present invention.
Figure 6A:
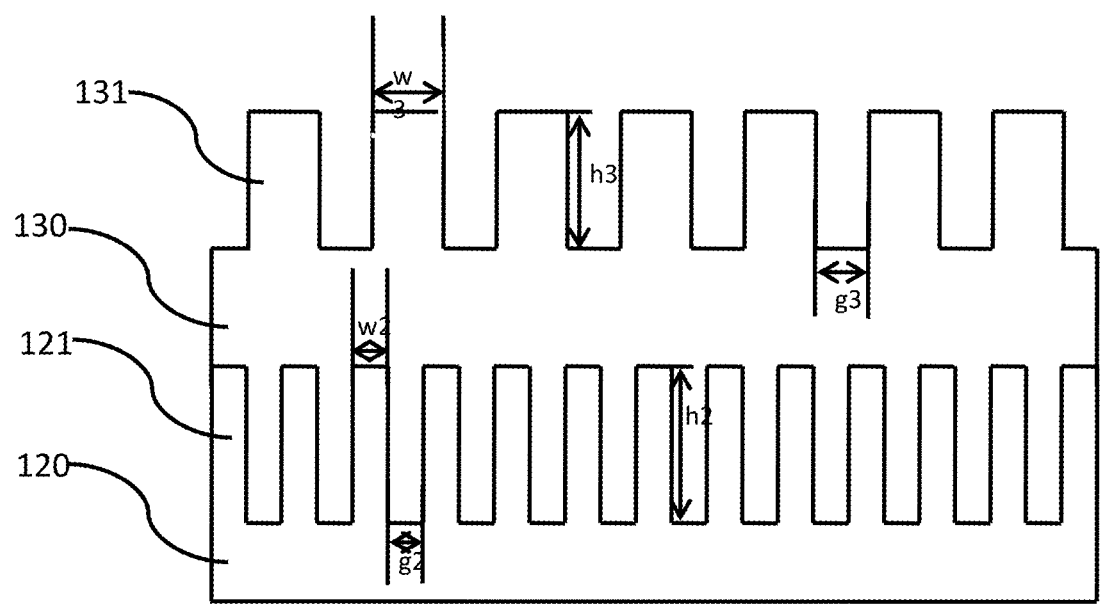
FIG. 6A is a cross-sectional perspective view of first diffraction gratings and second diffraction gratings of the present invention.

FIG. 5 shows a stereoscopic perspective view of an optical film 100' of another embodiment of the present invention. Selectively, the optical film 100' can further comprise a plurality of second diffraction gratings 131 along with second direction D2 formed on the second filling layer 130 of the optical film 100 as shown in FIG. 2, and the first direction D1 and the second direction D2 are substantially parallel. The dimensions of the second diffraction gratings 131 can be determined by the demand of different designs of displays, the corresponding light directing micro structures 111 and the first diffraction gratings 121. Referred to FIG. 6A, FIG. 6A shows a cross-sectional views of the first diffraction gratings 121 and the second diffraction gratings 131. As shown in FIG. 6A, each of the second diffraction gratings 131 has a height of h3 in the range of 0.5 µm to 1.5 µm, and preferably in the range of 0.7 µm to 1.3 µm, a width of w3 in the range of 0.3 µm to 1.5 µm, and preferably in the range of 0.4 µm to 0.6 µm. Each gap between two adjacent of the second diffraction gratings 131 is in the range of 0.3 µm to 1.5 µm, and preferably in the range of 0.4 µm to 0.6 µm. The second diffraction gratings 131 can have the same or different dimensions, and can be sequentially and periodically or randomly formed on the surface of the second filling layer 130.

In an embodiment of the present invention, the second diffraction gratings 131 can be formed by, such as embossing a curable resin, but not limited thereto. The refractive index of the second diffraction gratings can be in the range of 1.4 and 1.7. Suitable curable resin can be but not limited to an acrylic resin, a silicone resin, a polyurethane resin, an epoxy resin or the combinations thereof.

Due to the first direction D1 of the extension direction of the first diffraction gratings 121 and the second direction D2 of the extension direction of the second diffraction gratings are substantially parallel, the light from the back light unit can be redirected by the first diffraction gratings, and then be distributed to different viewing angles uniformly by the second diffraction gratings 131. Furthermore, the dimension settings, such as widths, heights and gaps, of the first diffraction gratings 121 and the second diffraction gratings 131 can be the same or different from each other depending on the demand of different designs of displays. In an embodiment of the present invention, the widths, the heights and the gaps of the first diffraction gratings 121 and the second diffraction gratings 131 are the same. In another embodiment of the present invention, the widths, the heights and the gaps of the first diffraction gratings 121 and the second diffraction gratings 131 are different.

Figure 6B:
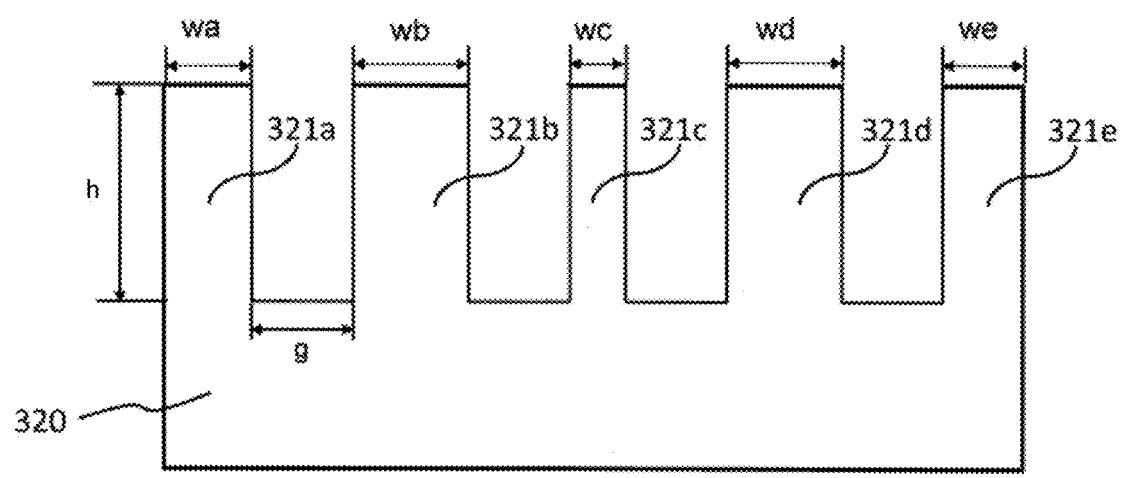
FIG. 6B-6E are cross-sectional perspective views of another diffraction grating layers of the present invention.
Figure 6C:
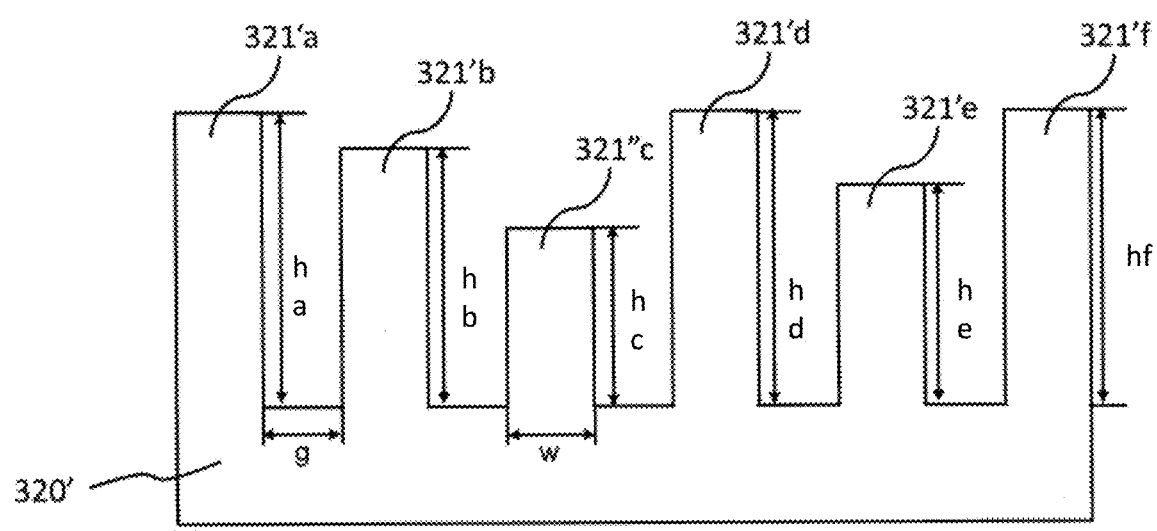
Figure 6D:
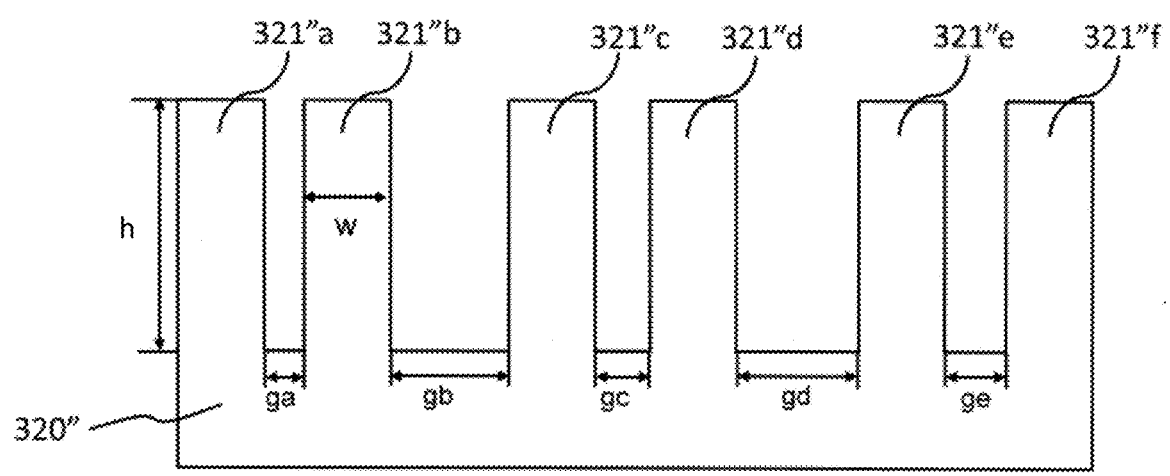
Figure 6E:
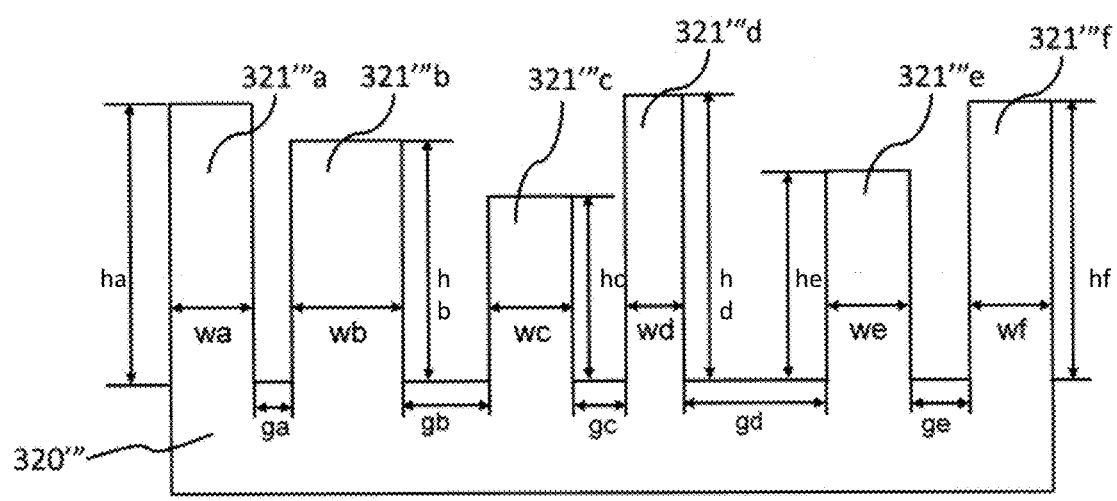

The widths, the heights and the gaps of the first diffraction gratings 121 and the second diffraction gratings 131 can be different. FIG. 6B to FIG. 6E illustrate another diffraction gratings of this present invention. FIG. 6B shows a cross-sectional view of a diffraction gratings 320 of an embodiment of the present invention, wherein the diffraction gratings 320 comprises gratings 321a~321e with same heights of h and same gaps of g but different widths of wa~we. FIG. 6C shows a cross-sectional perspective view of a diffraction gratings 320' of another embodiment of the present invention comprises gratings 321'a~321'f with same widths of w and same gaps of g but different heights of ha~hf. FIG. 6D shows a cross-sectional perspective view of a diffraction gratings 320" of further another embodiment of the present invention comprising gratings 321"a~321"f with same widths of w and same heights of h but different gaps of ga~ge. FIG. 6E shows a cross-sectional perspective view of a diffraction gratings 320''' comprises gratings 321'''a~321'''f with different widths of wa~wf, different heights of ha~hf and different gaps of ga~ge of gratings 321'''a~321'''f. The diffraction gratings 320, 320', 320" and 320''' can be used to replace the first diffraction gratings 121 and/or the second diffraction gratings 131 mentioned above.

Figure 7:
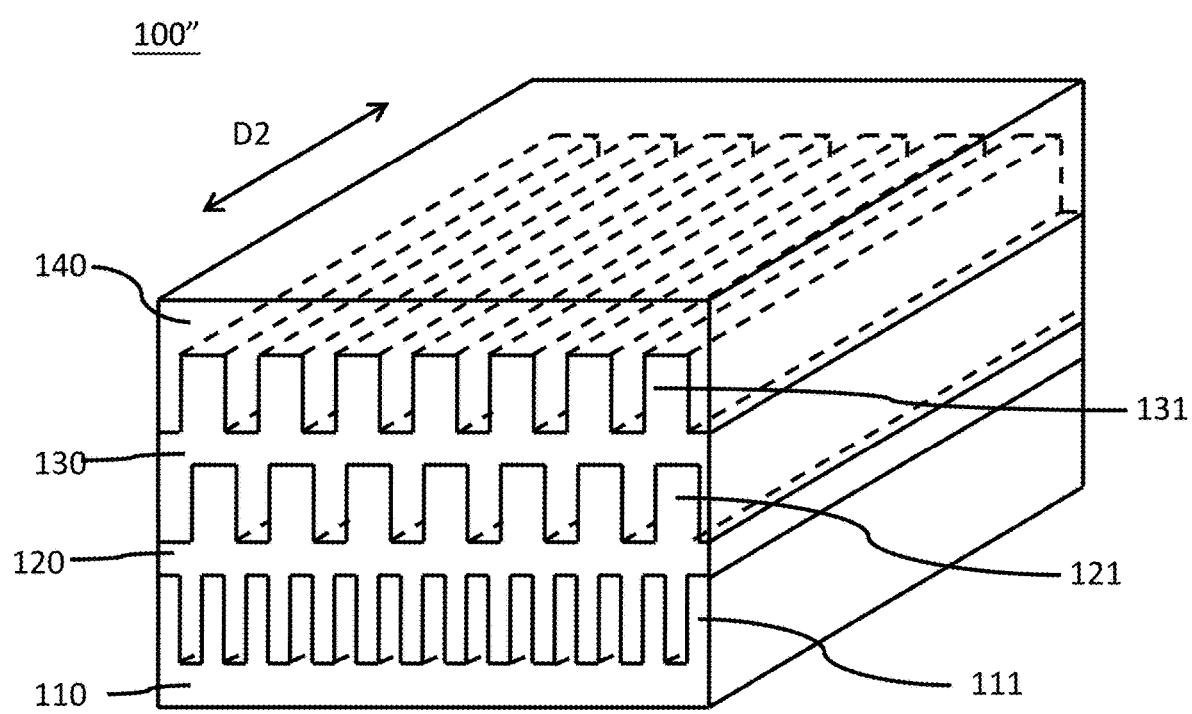
FIG. 7 is a stereoscopic perspective view of further another optical film of the present invention.

Referred to FIG. 7 which shows a stereoscopic perspective view of an optical film 100" of further another embodiment of the present invention. The optical film 100" can selectively comprise a third filling layer 140 disposed on the second diffraction gratings 131 of the optical film 100' as shown in FIG. 5 for filling the second diffraction gratings 131. The third filling layer 140 can be an UV curable resin or a thermal curable resin. Suitable curable resin can be but not limited to an acrylic resin, a silicone resin, a polyurethane resin, an epoxy resin or the combinations thereof. In an embodiment of the present invention, the refractive index of the third filling layer 140 can be in the range of 1.4 to 1.7, and the refractive index difference of the third filling layer 140 and the second diffraction gratings is no less than 0.1 and no more than 0.3.

In addition, in another embodiment of the present invention, the optical film 100, 100', 100" can further comprises a dye distributed in at least one or more of the light directing structure layer 110, the first filling layer 120 and the second filling layer 130 of the optical film 100, 100' selectively, or distributed in at least one or more of the light directing structure layer 110, the first filling layer 120, the second filling layer 130 and the third filling layer 140 of the optical film 100". Suitable dye comprises one or more types of dye molecules or light-absorbing particles for absorbing light with a specific wavelength. The dye can be chosen based on the main wavelength of the dark state light leakage to reduce the problem of dark state light leakage and maintain the color accuracy and saturation.

Suitable dye can comprise at least one type of dye molecules or light-absorbing particles. Suitable dye molecules can be but not limited to azo dyes, phthalocyanine dyes, triarylmethane dyes, anthraquinone dyes, hydroxy benzotriazole dyes, tris-resorcinol-triazine chromophore dyes, hydroxylphenyl-benzotriazole chromophore dyes, squarine-based dyes, cyanine-based dyes or the combinations thereof. Suitable light-absorbing particle can be but not limited to carbon black particles, graphite, metal oxide particles, black resin micro particles or the combinations thereof.

In an embodiment of the present invention, the dye can be added into the light directing structure layer 110, the first filling layer 120, the second filling layer 130 or the third filling layer 140, and the dye is present at an amount of 0.01% to 3% based on the total amount of the layers. When the addition amount is higher than the above range, the brightness of bright state of the display will be affected. When the addition amount is lower than the above range, the uniformity of the dark state will be affected.

In an embodiment of the present invention, the optical film 100" can further comprise a functional film (not shown). The functional film can be adhered to the third filling layer 140 with or without an adhesive (not shown) therebetween. The functional film 160 can be but not limited to a polarizing film, a hard-coating film, a low reflective film, an anti-reflective film, an anti-glaring film, a protective film, the combinations thereof or the like. In another embodiment of the present invention, the optical film 100, 100',100" is adhered to a liquid crystal panel directly.

The following examples are presented to enable those skilled in the art to understand and to practice the present invention. They should not be considered as a limitation on the scope of the invention, but merely as being illustrative and representative thereof.

EXAMPLE

Example 1

The optical film of this example comprises a light directing structure layer, a first filling layer (the refractive index is about 1.6), a plurality of first diffraction gratings along with the first direction D1 and a second filling layer (the refractive index is about 1.5). Wherein the heights of the light directing micro structures of the light directing structure layer are about 15 μm, the widths of the light directing micro structures of the light directing structure layer are about 5 μm, the gaps between adjacent two of the light directing micro structures of the light directing structure layer are about 24 μm, the ratio of the height to the width of the light directing micro structures of the light directing structure layer is about 3, and the light directing structure layer comprises an azo dye. The first diffraction gratings can be generated by sequential and periodically formed the gratings 1~11 with various dimensions as shown in the following Table 1. More or less gratings formed on the first filling layer can also be generated according to this present invention.

The optical film of this example was adhered to a liquid crystal display (BenQGW2270, commercially available from BenQ, Taiwan) and the optical properties were measured and showed in the following Table 2.

TABLE 1

Dimensions of diffraction gratings of the optical film

| Dimensions of gratings | Gratings | | | | | | | | | | |
|---|---|---|---|---|---|---|---|---|---|---|---|
| | 1 | 2 | 3 | 4 | 5 | 6 | 7 | 8 | 9 | 10 | 11 |
| Width of w1 (μm) | 0.6 | 0.6 | 0.5 | 0.4 | 0.5 | 0.6 | 0.6 | 0.5 | 0.4 | 0.4 | 0.4 |
| Height of h1 (μm) | 1.3 | 0.8 | 0.9 | 0.8 | 1.1 | 1.0 | 1.2 | 1.0 | 0.7 | 0.8 | 0.8 |
| Gap of g1 (μm) | 0.6 | 0.6 | 0.6 | 0.4 | 0.4 | 0.6 | 0.4 | 0.6 | 0.5 | 0.5 | 0.4 |

Example 2

The optical film of this example comprises a light directing structure layer, a first filling layer (the refractive index is about 1.6), a plurality of first diffraction gratings along with first direction D1 and a second filling layer (the refractive index is about 1.5). Wherein the heights of the light directing micro structures of the light directing structure layer are about 15 μm, the widths of the light directing micro structures of the light directing structure layer are about 5 μm, the gaps between adjacent two of the light directing micro structures of the light directing structure layer are about 24 μm, the ratios of height to width of the light directing micro structures of the light directing structure layer are about 3, and the light directing structure layer comprises an azo dye. The first diffraction gratings can be generated by sequential and periodically formed the gratings 1~11 with various dimensions as shown in the above Table 1. More or less gratings formed on the first filling layer can also be generated according to this present invention. The second filling layer comprises a phthalocyanine dye.

The optical film of this example was adhered to a liquid crystal display (BenQGW2270, commercially available from BenQ, Taiwan) and the optical properties were measured and showed in the following Table 2.

Comparative Example 1

The optical properties of a liquid crystal display (BenQGW2270, commercial available from BenQ, Taiwan) with the present optical film were measured and showed in the following Table 2.

TABLE 2

The optical properties of Example1-2 and Comparative example1

| | Example 1 | Example 2 | Comparative example 1 |
|---|---|---|---|
| L0 | 0.110 | 0.108 | 0.067 |
| The maximum of L0 | 0.419 | 0.360 | 0.703 |
| The angle of the maximum of L0 | −46 | 42 | 44 |
| The average of GDI (60°-80°) | 1.33 | 1.32 | 1.55 |
| P-value (0.60) | 4.03 | 4.13 | 5.65 |
| P-value (0.80) | 4.27 | 4.40 | 6.79 |
| The average of P-value (60°-80°) | 4.17 | 4.36 | 6.33 |

As shown in the Table 2, the values of maximum brightness in the dark state of the liquid crystal display with zero-order (the maximum of L0) of the Example 1-2 are both smaller than the value of 0.703 nits of the Comparative example, which represents that light leakage at wide viewing angles of the common liquid crystal display can be reduced effectively and the common liquid crystal display can present uniform dark state images at different viewing angles by adhering the present optical film. GDI (Gamma Distortion Index) and P-value are indexes reflecting to the image quality, such as, color saturation, contrast ration and color accuracy, at large viewing angle of the known liquid crystal display. GDI is calculated by measuring the distortion value of the gamma curve compared to the standard gamma curve (such as gamma 2.2) of all order from L0 to L255. Therefore, lower value of GDI means the distortion is lower and represents the image quality at large viewing angle is better. P-value is the difference between the actual measurement and the standard gamma curve at the order of L96 which the liquid crystal display generally has defect, lower p-value represents lower deviation. Therefore, the image quality of the display can be evaluating by the GDI value and p-value. As shown in the table 2, the average of GDI at horizontal viewing angle from 60° to 80°, P-value at horizontal viewing angle 60° (0,60), P-value at horizontal viewing angle 80° (0,80) and the average of P-value at horizontal viewing angle from 60° to 80° of Example 1-2 are all less than Comparative example 1. The optical film of the present invention can improve the image quality effectively.

From the results of Examples 1 to 2 and Comparative Examples 1, the liquid crystal display with the present optical films of Examples 1 to 2 can improve the image quality by reducing the light leakage at wide viewing angles from 60° to 80° in dark state compared to the liquid crystal display without the present optical film.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An optical film comprising:
    a light directing structure layer comprising a plurality of light directing micro structures, wherein the ratios of height to width of the light directing micro structures are in the range of 1.5 to 6, and the light directing structure layer further comprising a dye including at least dye molecules or light-absorbing particles for absorbing light with a specific wavelength;
    a first filling layer disposed on the light directing micro structures and covering the light directing micro structures, wherein the refractive index of the first filling layer and the light directing structure layer are different;
    a plurality of first diffraction gratings along with first direction formed on the first filling layer; and
    a second filling layer disposed on the first gratings, wherein the refractive index of the second filling layer and the first diffraction gratings are different.

2. The optical film according to claim 1, wherein the heights of the light directing micro structures are independently in the range of 15 µm to 30 µm.

3. The optical film according to claim 1, wherein the widths of the light directing micro structures are independently in the range of 5 µm to 9 µm.

4. The optical film according to claim 1, wherein the gaps between adjacent two of the light directing micro structures are independently in the range of 24 µm to 45 µm.

5. The optical film according to claim 1, wherein the light directing micro structures are continuous or discontinuous columnar micro structures.

6. The optical film according to claim 1, wherein the cross-sectional shape of each light directing micro structure is independently selected from one of the group consisting of polygon, circle, oval, quadrilateral and diamond shape.

7. The optical film according to claim 1, wherein the difference of the refractive index of the second filling layer and the first diffraction gratings is no less than 0.1 and no more than 0.3.

8. The optical film according to claim 1, wherein a plurality of second diffraction gratings along with second direction are formed on the second filling layer;
    and the first direction and the second direction are substantially parallel.

9. The optical film according to claim 8, further comprising a third filling layer disposed on the second diffraction gratings for filling the second diffraction gratings, wherein the refractive index of the third filling layer and the second diffraction gratings are different.

10. The optical film according to claim 9, wherein the difference of the refractive index of the third filling layer and the second diffraction gratings is no less than 0.1 and no more than 0.3.

11. The optical film according to claim 9, wherein the third filling layer further comprising a dye including at least dye molecules or light-absorbing particles for absorbing light with a specific wavelength.

12. The optical film according to claim 9, further comprising a functional film adhered to the third filling layer, wherein the functional film is selected from one of a group consisting of a polarizing film, a hard-coating film, a low reflective film, an anti-reflective film, an anti-glaring film and a protective film or combinations thereof.

13. The optical film according to claim 8, wherein the widths of the first diffraction gratings and the widths of the second diffraction grating are independently in the range of 0.3 µm to 1.5 µm.

14. The optical film according to claim 8, wherein the gaps between adjacent two of the first diffraction gratings and the gaps between adjacent two of the second diffraction gratings are independently in the range of 0.3 µm to 1.5 µm.

15. The optical film according to claim 8, wherein the heights of the first diffraction gratings and the heights of the second diffraction gratings are independently in the range of 0.5 µm to 1.5 µm.

16. The optical film according to claim 1, wherein the first filling layer further comprising a dye including at least dye molecules or light-absorbing particles for absorbing light with a specific wavelength.

17. The optical film according to claim 1, wherein the second filling layer further comprising a dye including dye molecules or light-absorbing particles for absorbing light with a specific wavelength.

18. The optical film according to claim 1, further comprising an adhesive layer disposed between the first filling layer and the first diffraction gratings.

* * * * *